US011974087B2

United States Patent

Karkera et al.

(10) Patent No.: US 11,974,087 B2
(45) Date of Patent: Apr. 30, 2024

(54) HEADPHONE SYSTEM

(71) Applicant: RAPTURE INNOVATION LABS PRIVATE LIMITED, Mangalore Karnataka (IN)

(72) Inventors: Navajith Padmanabha Karkera, Mangalore Karnataka (IN); Jagath Biddappa, Mangalore Karnataka (IN); Preetham, Mangalore Karnataka (IN)

(73) Assignee: RAPTURE INNOVATION LABS PRIVATE LIMITED, Mangalore Karnataka (IN)

( * ) Notice: Subject to any disclaimer, the term of this patent is extended or adjusted under 35 U.S.C. 154(b) by 338 days.

(21) Appl. No.: 17/430,048

(22) PCT Filed: Jan. 27, 2020

(86) PCT No.: PCT/IB2020/050592

§ 371 (c)(1),
(2) Date: Aug. 11, 2021

(87) PCT Pub. No.: WO2020/165667

PCT Pub. Date: Aug. 20, 2020

(65) Prior Publication Data

US 2022/0086556 A1 Mar. 17, 2022

(30) Foreign Application Priority Data

Feb. 12, 2019 (IN) ............................. 201941005439

(51) Int. Cl.
*H04R 1/10* (2006.01)
*H04R 1/28* (2006.01)

(52) U.S. Cl.
CPC ......... *H04R 1/1041* (2013.01); *H04R 1/1008* (2013.01); *H04R 1/1075* (2013.01); *H04R 1/2888* (2013.01); *H04R 2460/13* (2013.01)

(58) Field of Classification Search
CPC .. H04R 1/1041; H04R 1/1008; H04R 1/1075; H04R 1/2888; H04R 2460/13;
(Continued)

(56) References Cited

U.S. PATENT DOCUMENTS 9,072,650 B2 * 7/2015 Kim ....................... A61H 3/068
9,549,260 B2 1/2017 Oishi et al.
(Continued)

FOREIGN PATENT DOCUMENTS

CN 104811838 A 7/2015
EP 3403416 B1 3/2020

OTHER PUBLICATIONS

Corresponding International Patent Application No. PCT/IB2020/050592, International Search Report dated May 14, 2020.
(Continued)

*Primary Examiner* — Akelaw Teshale
(74) *Attorney, Agent, or Firm* — Cooper Legal Group LLC

(57) ABSTRACT

An headphone system (100) with improved sound reproduction capability is disclosed. The system includes a housing (101); a receiver configured with the housing (101) and to receive audio signals from one or more computing devices; a control circuitry (108) configured with the housing (101). A frequency of each of the received audio signals is determined by extracting audio attributes from the received audio signals. Then the determined frequency of each of the received audio signals is compared with a predefined threshold. In response to the comparison, the received audio signals are segregated into at least two set of signals including a first set of audio signals and a second set of audio signals. The first set of audio signals is converted into a first set of vibration signal energy and a second set of audio signals is converted into a second set of vibration signal.

10 Claims, 6 Drawing Sheets

(58) Field of Classification Search
CPC ........ H04R 2460/03; H04R 3/14; H04R 3/04; H04R 5/033; H04R 2430/01; H04R 1/1016; H04R 1/10; H04R 9/06; H04R 1/105; H04R 2400/03; H04R 1/2811; H04R 1/1083; H04R 3/00; H04R 1/26; H04R 5/0335; H04R 1/2803; H04R 2410/05; H04R 2430/03; H04R 3/12; H04R 3/02; H04R 1/1025; H04R 1/24; H04R 1/2896; H04R 1/2857; H04R 1/345; H04R 3/005; H04R 2499/11
See application file for complete search history.

(56) References Cited

U.S. PATENT DOCUMENTS

| | | | | |
|---|---|---|---|---|
| 2011/0243344 | A1* | 10/2011 | Bakalos | G10K 11/17837 381/71.1 |
| 2015/0189441 | A1* | 7/2015 | Oishi | H04R 5/04 381/309 |
| 2016/0192060 | A1* | 6/2016 | Noertker | H04R 1/1075 381/74 |
| 2016/0192064 | A1* | 6/2016 | Timothy | H04R 1/2815 381/74 |
| 2016/0212521 | A1* | 7/2016 | Huang | H04R 1/24 |
| 2017/0208380 | A1* | 7/2017 | Slater | H04R 1/1083 |

OTHER PUBLICATIONS

Corresponding International Patent Application No. PCT/IB2020/050592, Written Opinion dated May 14, 2020.
Corresponding India Patent Application No. 201941005439, Examination Report dated Jan. 18, 2021.

* cited by examiner

HEADPHONE SYSTEM

TECHNICAL FIELD

The present disclosure relates to a headphone. More particularly, the present disclosure is related to a headphone with improved sound reproduction capability especially in the low frequency range. It can also be used to enhance the low frequency audio output compared to other existing headphones.

BACKGROUND

The background description includes information that may be useful in understanding the present invention. It is not an admission that any of the information provided herein is prior art or relevant to the presently claimed invention, or that any publication specifically or implicitly referenced is prior art.

Conventional headphones typically include an audio driver to convert electrical signal to mechanical energy thereby producing sound. However, since human audible audio range is the range of 20 Hz to 20,000 Hz, it becomes very difficult for a single audio driver to accurately reproduce sound over this entire audio range. Some high-end headphone manufacturers are able to achieve accurate sound reproduction due to years of expertise in R&D and manufacturing but the output power and quality of low frequency audio is still limited. Some manufactures particularly include an arrangement of multiple drivers in the headphones, where each audio driver is fed with a particular range of audio signal (e.g., one driver is fed with signal of 20 Hz-200 Hz, other with 200 Hz-4 KHZ and another driver fed with 4 KHz 20 KHz on each side). However, even with such approaches, it is still difficult to reproduce and/or enhance low frequency audio sound due to design limitation of the speaker in conventional headphones.

In addition, low frequency signal (also known as Bass) requires large amount of energy (power) because a larger excursion (Excursion means linear movement) of the speaker diaphragm is required to reproduce or enhance bass response. The speakers in conventional speakers are limited by their diaphragm's mechanical and material properties, which limits its diaphragm excursion. In case when the input power of the signal is increased, excursion required by the signal may be more than the diaphragm excursion. In such cases, the speakers produce distorted audio when operated above its safety limits and will get damaged due to prolonged exposure to high power.

Also, the low frequency spectrum (bass) of the audio spectrum is more sensed by humans than being heard. This is why many home theatre speakers comes with a dedicated speaker unit called as Sub-woofer unit to reproduce low frequency vibrations. The sub-woofers produce strong air pressure waves to create a feel of bass. However, due to the size and weight limitation of headphones it becomes impractical to include a sub-woofer in a headphone. Also, smaller sub-woofers have reduced performance and complexity in integration.

Therefore, there is a need of an improved headphone system that can overcome above-mentioned challenges in the art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF THE INVENTION

A general object of the present disclosure is to provide an improved headphone system that facilitates enhanced and more powerful low frequency response in the headphone.

Another object of the present disclosure is to provide an headphone system that has improved listening experience compared to conventional headphones.

Another object of the present disclosure is to provide a headphone system that provides removable and replaceable speaker driver with different tuning/sound signatures.

Another object of the present disclosure is to provide a headphone system that minimizes fatigue compared to conventional headphones.

Another object of the present disclosure is to provide a headphone system that has compact size, cost-effective, and easy to implement.

These and other objects of the present invention will become readily apparent from the following detailed description taken in conjunction with the accompanying drawings.

SUMMARY

The present disclosure relates to a headphone. More particularly, the present disclosure is related to a headphone with improved sound reproduction capability especially in the low frequency range. It can also be used to enhance the low frequency audio output compared to other existing headphones.

In an aspect of the present disclosure provides a headphone system. The system comprising: a housing; a receiver configured with the housing and to receive audio signals from one or more computing devices; a control circuitry configured with the housing. The control circuitry comprising one or more processors communicatively coupled to a memory storing a set of instructions executable by the one or more processors, the one or more processors upon execution of the set of instructions causes the control circuitry to: determine frequency of each of the received audio signals; compare the determined frequency of each of the received audio signals with a predefined threshold; responsive to the comparison, segregate the received audio signals into at least two sot of signals comprising a first set of audio signals and a second sot of audio signals, wherein the first set of audio signals comprises a set of signals of the received audio signals, having frequencies less than the predefined threshold, and wherein the second set of audio signals comprises a set of signals of the received audio signals, having frequencies more than the predefined threshold. The system comprises a first audio driver operatively coupled to the control circuitry, the first audio driver being configured to convert the first set of audio signals into a first set of vibration signals: a second audio driver operatively coupled to the control circuitry, the second audio driver being configured to convert the second set of audio signals into a second set of vibration signals.

In an embodiment, the system comprises an ear cushion coupled to the first audio driver, wherein the coupling of the first audio driver with the ear cushion allows the first set of vibration energy to pass from the first audio driver to the ear cushion.

In an embodiment, the system comprises a mounting plate coupled with a speaker plate of the housing, wherein the first audio driver is coupled to the mounting plate such that the first set of vibration signals is transferred from the first audio driver to the ear cushion through the mounting plate, and wherein the second audio driver is attached to the speaker plate such that the second set of vibration signals is transferred from the second audio driver to an outer air medium.

In an aspect, the system comprises a vibrational isolator or vibration damper configured to reduce vibration at one or more components of the housing, which does not contribute in audio production.

In an aspect, at least one of the first and second audio drivers is detachably coupled to the speaker plate of the housing.

In an aspect, the first audio driver maybe directly coupled to the ear cushion instead of using the mounting plate or the speaker plate.

In an aspect, the control circuitry is configured to control one or more parameters of the first and second set of vibration signals for audio production of wide genre of music.

In an aspect, the control circuitry comprises one or more audio amplifiers configured to control amplitude of at least one of the first and the second sets of audio signals.

In an embodiment, the first set of vibration signals is transmitted through fluid or solid medium, and wherein the second set of vibration signals is transmitted through air medium.

In an aspect, the control circuitry is operated automatically.

In an aspect of the present disclosure provides a method in a headphone system, the method comprising: receiving audio signals from one or more computing devices; determining frequency of each of the received audio signals; comparing the determined frequency of each of the received audio signals with a predefined threshold; responsive to the comparison, segregating the received audio signals into at least two set of signals comprising a first set of audio signals and a second set of audio signals, wherein the first set of audio signals comprises a set of signals of the received audio signals, having frequencies less than the predefined threshold, and wherein the second set of audio signals comprises a set of signals of the received audio signals, having frequencies more than the predefined threshold; and converting the first set of audio signals into a first set of vibration signals and the second set of audio signals into a second set of vibration signals.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
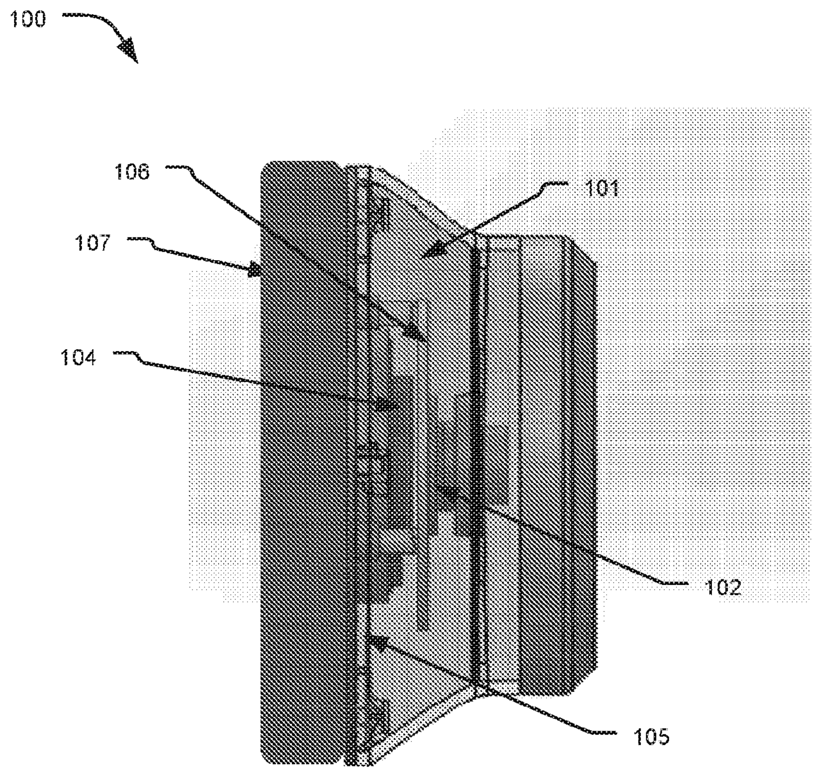
FIG. 1 illustrates exemplary perspective views of a proposed headphone system 100 in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

If the specification states a component or feature "may", "can", "could", or "might" be included or have a characteristic, that particular component or feature is not required to be included or have the characteristic.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as welt as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Various terms are used herein. To the extent a term used in a claim is not defined, it should be given the broadest definition persons in the pertinent art have given that term as reflected in printed publications and issued patents at the time of filing.

Embodiments explained herein relates to a headphone. More particularly, the present disclosure is related to a headphone with improved sound reproduction capability especially in the low frequency range. It can also be used to enhance the low frequency audio output compared to other existing headphones.

In an aspect of the present disclosure provides a headphone system. The system may include a housing; a receiver configured with the housing and to receive audio signals from one or more computing devices; a control circuitry configured with the housing. The control circuitry may include one or more processors communicatively coupled to a memory storing a set of instructions executable by the one or more processors, the one or more processors upon execution of the set of instructions may cause the control circuitry to: determine frequency of each of the received audio signals; compare the determined frequency of each of the received audio signals with a predefined threshold; responsive to the comparison, segregate the received audio signals into at least two set of signals comprising a first set of audio signals and a second set of audio signals, wherein the first set of audio signals comprises a set of signals of the received audio signals, having frequencies less than the predefined threshold, and wherein the second set of audio signals may include a set of signals of the received audio signals, having frequencies more than the predefined threshold. The system may include a first audio driver operatively coupled to the control circuitry, the first audio driver being configured to convert the first set of audio signals into a first set of vibration signals. The system may will further include a second audio driver operatively coupled to the control circuitry, the second audio driver being configured to convert the second set of audio signals into a second set of vibration signals.

In an embodiment, the system may include an ear cushion coupled to the first audio driver, wherein the coupling of the first audio driver with the ear cushion may allow the first set of vibration energy to pass from the first audio driver to the ear cushion.

In an embodiment, the system may include a mounting plate coupled with a speaker plate of the housing, wherein the first audio driver may be coupled to the mounting plate such that the first set of vibration signals may be transferred from the first audio driver to the ear cushion through the mounting plate, and wherein the second audio driver may be attached to the speaker plate such that the second set of vibration signals is transferred from the second audio driver to an outer air medium.

In an aspect, the system may include a vibrational isolator that may be configured to reduce vibration at one or more components of the housing, which does not contribute in audio production.

In an embodiment, at least one of the first and second audio drivers may be detachably coupled to the speaker plate of the housing.

In an aspect, the control circuitry may be configured to control one or more parameters of the first and second set of vibration signals for audio production of wide genre of music.

In an aspect, the control circuitry may include one or more audio amplifiers configured to control amplitude of at least one of the first and the second sets of audio signals.

In an embodiment, the first set of vibration signals may be transmitted through fluid or solid medium, and wherein the second set of vibration signals may be transmitted through air medium.

In an aspect, the control circuitry may be operated automatically.

In an aspect of the present disclosure provides a method in a headphone system, the method may include receiving audio signals from one or more computing devices; determining frequency of each of the received audio signals; comparing the determined frequency of each of the received audio signals with a predefined threshold; responsive to the comparison, segregating the received audio signals into at least two set of signals comprising a first set of audio signals and a second set of audio signals. The first set of audio signals may include a set of signals of the received audio signals, having frequencies less than the predefined threshold.

In an aspect, the second set of audio signals may include a set of signals of the received audio signals, having frequencies more than the predefined threshold. The method further may include converting the first set of audio signals into a first set of vibration signal and the second set of audio signals into a second set of vibration signals.

FIG. 1 illustrates exemplary perspective views of a proposed headphone system 100, in accordance with an embodiment of the present disclosure. As illustrated in FIG. 1, the proposed headphone system 100 (interchangeably referred to as system 100) may include a housing 101. The system 100 may include a control circuitry 108 (shown in FIG. 2), a first audio driver 102, and a second audio driver 104. In an embodiment, the first 102 and/or the second 104 audio drivers may be operatively coupled to the control circuitry 108.

In an embodiment, the system 100 may include a receiver that may be configured with the housing. The receiver may be configured to receive one or more audio signals. In an embodiment, the one or more audio signals may be received from one or more computing devices such as but not limited to a small camera, a smart phone, a portable computer, a personal digital assistant, a handheld device and the like. The system 100 may be connected to the one or more computing devices through a wired connection or wirelessly. In an embodiment, the signals may be electrical signals.

In an embodiment, the system 100 may be configured to connect with one or more computing devices through any network. The network may be a wireless network, a wired network or a combination thereof that may be implemented as one of the different types of networks, such as Intranet, Local Area Network (LAN), Wide Area Network (WAN), Internet, Bluetooth, and the like. Further, the network may either be a dedicated network or a shared network. The shared network may represent an association or the different types of networks that may use variety of protocols, for example, Hypertext Transfer Protocol (HTTP), Transmission Control Protocol/Internet Protocol (TCP/IP), Wireless Application Protocol (WAP), and the like.

In an embodiment, the system 100 may include a control circuitry 108 that may be configured with the housing. The control circuitry 108 may be coupled with the receiver. The control circuitry 108 may be configured to perform one or more operations. In on aspect, the control circuitry may include one or more processor(s). The one or more processor (s) may be implemented as one or more microprocessors, microcomputers, microcontrollers digital signal processors, central processing units, logic circuitries, and/or any devices that manipulate data based on operational instructions. Among other capabilities, the one or more processor(s) are configured to fetch and execute computer-readable instructions stored in a memory of the system 100. The memory may store one or more computer-readable instructions or routines, which may be fetched and executed to create or share the data units over a network service. The memory may include any non-transitory storage device including, for example, volatile memory such as random access memories (RAMs), programmable read-only memories (PROMs), erasable PROMs (EPROMs), electrically erasable PROMs (EEPROMs), and the like. In another embodiment, the control circuitry 108 may include a printed circuit board (PCB) for housing all the necessary electronic systems and sub systems and providing a platform for electric coupling of the various components of the system 100. In an exemplary embodiment, the receiver may be part of the control circuitry 108.

In an embodiment, the control circuitry may be operated automatically. Additionally, or alternatively, the control circuitry may be operated manually by suitable means such as switch and the like.

In an embodiment, the control circuitry 108 may be configured to determine frequency of each of the received audio signals. The frequency of each of the audio signal may be determined. In an exemplary embodiment, the one or more attributes may include any one or a combination of bandwidth, gain, power level, voltage level and so forth. In an example, the bandwidth and voltage level of the audio signals may be extracted and based on the extraction, the frequency of each of audio signal may be determined. The frequency may be determined or automatically segregated using audio filters or Digital Signal Processor unit or information shared by the connected audio host device.

In an embodiment, the control circuitry 108 may be configured to compare the frequency of each of the audio signals with a predefined threshold. The predefined threshold may have any value based on one or more applications and user requirement. Based on the comparison, the control circuitry 108 may be configured to segregate the audio signals into at least two set of signals. In an exemplary embodiment, the at least two set of signals may include a first set of audio signals and a second set of audio signals. The first set of audio signals may include a set of signals of the received audio signals, having frequencies less than the predefined threshold. In other words, frequency of each of the first set of audio signals may be less than or equal to the predefined threshold.

In another embodiment, the second set of audio signals may include a set of signals of the received audio signals, having frequencies more than the predefined threshold in other words, frequency of each of the second set of audio signals may be greater than the predefined threshold. Thus, the step of segregation may divide the entire audio signals or spectrum into two set of audio signals, where frequency range of the each of the two sets of audio signals may be based on the predefined threshold. In another embodiment, the control circuitry 108 may include one or more audio amplifiers configured to control one or more parameters such as but not limited to amplitude, phase difference of at least one of the first and the second sets of audio signals. Each of the first and second sets of audio signals may be in form of electrical signals.

In an exemplary embodiment, based on the predefined threshold, the first set of audio signals may be associated with a first frequency range and the second set of audio signals may be associated with a second frequency range. Based on first and second frequency range, the value of the predefined threshold may be selected. In an exemplary embodiment, when the value of the predefined threshold is 200 Hz, the first range (also referred as low frequency range) may be a frequency range of 20 Hz-200 Hz and the second range (also referred as medium or high frequency range) may be a frequency range of 200 Hz-20 kHz.

In an exemplary embodiment, the at least two sets of signals may include a first set of audio signals, a second set of audio signals, and a third set of audio signals. In this case, the predefined threshold may include a first threshold and a second threshold being larger than the first threshold. Each of the first set of audio signals, the second set of audio signals, and the third set of audio signals may be associated with a first range, a second range, and a third range. Values of the first threshold and the second threshold may be selected based on the first, second, and third ranges. The above embodiments have described with two and three set of audio signals, respectively, however it would be appreciated by a person skilled in the art that the at least two set of signals may include any number of set of signals such as fourth, fifth, sixth and the like.

In an embodiment, the system 100 may include one or more audio drivers that may be operatively coupled to the control circuitry 108. In an exemplary embodiment, the one or more drivers may include, by way of example but not limited to, the first audio driver 102 and the second audio driver 104.

In an embodiment, the system 100 may include a speaker plate 105 that may be coupled with at least one of the first 102 and the second 104 audio drivers. In an exemplary embodiment, the one or more audio drivers may be coupled to the speaker plate 105 concentrically. In an exemplary embodiment, the system 100 may include a mounting plate 106 coupled with the speaker plate 105. In an embodiment, the mounting/coupling plate can be any thin and light material of any shape and size. In an exemplary embodiment, the first audio driver 102 may be attached to the mounting plate 106 and the second audio driver 104 may be directly attached to the speaker plate 105. In another exemplary embodiment, the first audio driver 102 may be directly coupled with the speaker plate 105 to further reduce size of the overall system.

In an embodiment, the first audio driver 102 may be configured to convert the first set of audio signals into a first set of vibration signals. In an exemplary embodiment, the first set of vibration signals may be transmitted through any medium. In an preferred embodiment, the first set of vibration signals may be transmitted through fluid or solid medium. The second audio driver 104 may be configured to convert the second set of audio signals into a second set of vibration signals. In an exemplary embodiment, the second set of vibration signals may be transmitted through any medium. In an preferred embodiment, the second set of vibration signals may be transmitted through air medium. Each of the first and second sets of audio related vibration signals may be considered as mechanical vibration movement or displacement. In other words, the first 102 and the second 104 audio drivers configured to convert electrical audio signals into mechanical vibration. In an embodiment, at least one of the first and second audio drivers 102 and 104 may include magnet and voice coil, which may enable the at least one of the first and second audio drivers 102 and 104 to convert respective set of audio signals into corresponding vibration signals. In another embodiment, the magnet, suspension and the voice coil of the first audio driver 102 may be acoustically coupled to the mounting plate 106.

In an exemplary embodiment, the second audio driver 104 may include the coil that maybe attached to a diaphragm which may vibrate according to the second set of audio signals. This vibration may pass through an air gap between the diaphragm and ear of a user. The resulting dynamic air pressure variation (air waves) may vibrate the inner ear which sends the signals to the brain and equivalent sound is heard by humans. In an embodiment, the diaphragm may be made of paper, paper composites and laminates, plastic materials such as polypropylene or composite materials and so forth.

In an embodiment, the first audio driver 102 may be configured with or without diaphragm. In a preferred embodiment, the first audio driver 102 may be configured without diaphragm. The first audio driver 102 may be coupled with the mounting plate 106. The mounting plate 106 may be made of any vibration conducting material (acoustically tuned or untuned) like metal, non-metals, composite or plastics and the like. In an embodiment, the mounting plate 106. With the mounting plate, mechanical strength of the first audio driver 102 may be increased up to a certain extent. In another embodiment, at least one of the first 102 and second 104 audio drivers may be detachably coupled to the speaker plate of the housing.

In an embodiment, the system 100 may include an ear cushion 107 that may be coupled to the first audio driver 102. The coupling of the ear cushion with the first audio driver allow the vibration i.e. first set of vibration signals to pass through the ear cushion 107. In case of mounting plate 106, the first set of vibration may pass to the ear cushion 107 through the mounting plate 106.

In another embodiment, the system 100 may include the ear cushion 107 coupled to a front face of the speaker plate 105. In an embodiment, the coupling of the speaker plate 105 with the ear cushion 107 may allow the vibration i.e. first set of vibration signals to pass from the speaker plate 105 to the ear cushion 107. The ear cushion 107 may be configured to allow transmission of the first set of vibration signals outside of the system. In case, when the first audio driver is configured without the diaphragm, the ear cushion may be configured to act as virtual diaphragm.

In another embodiment, the first set of vibration signals may be transferred from the first audio driver 102 to the mounting plate 106. As the mounting plate 106 is coupled to the speaker plate, the first set of vibration signals may pass through the speaker plate 105 from the mounting plate 106 and then may get transferred to the ear cushion 107. The ear cushion 107 may act a pseudo/virtual diaphragm. The ear cushion 107 may then transfer the first set of vibration signals or mechanical vibration to the user's outer ears and the skull region through bone or body conduction principle or combination of both. In another embodiment, the second set of vibration signals may be configured to pass to outer air medium (outside the system 100) from the second audio driver.

In an embodiment, the control circuitry 108 may be configured to control one or more parameters such as but not limited to amplitude, bandwidth, frequency, phase difference of at least one of the first and second set of vibration signals for enhanced audio reproduction of wide genre of music.

Figure 2:
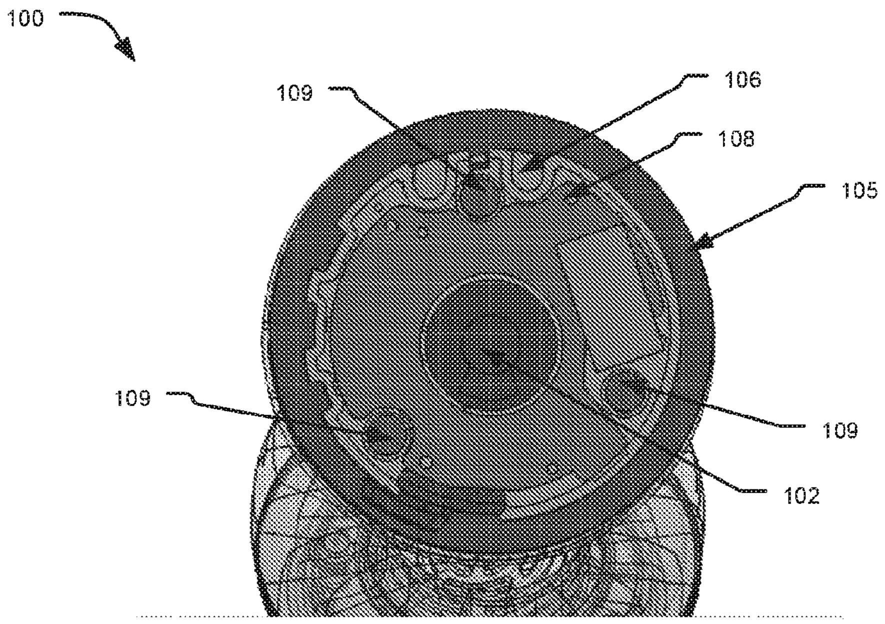
FIG. 2 illustrates exemplary sectional view of a proposed headphone system, in accordance with an embodiment of the present disclosure.

FIG. 2 illustrates exemplary sectional view of a proposed headphone system 100 in accordance with an embodiment of the present disclosure. FIG. 2 illustrates configuration of the one or more components such as the mounting plate 106, the control circuitry 108, the speaker plate 105, the first audio driver 102.

In another embodiment, as illustrated in FIG. 2, the system 100 may include a vibrational isolator 109 that may be configured to minimize unnecessary and un required coupling of the vibration energy generated by the audio driver to non performing/non contributing parts and components of the headphone so as to improve acoustics performance, minimize distortion and increase system efficiency. Particularly, the vibrational isolator 109 may minimize the generated vibration from being transferred to other components that is not contributing in vibration related audio reproduction. In an embodiment, the vibration isolator 109 may localize the audio frequency vibration and transfer audio frequency vibration only towards ear pads/ear cushions or speaker mounting plate and prevent the mechanical vibration from being transmitted to unnecessary and non performing/non-contributing components or systems thereby improving audio performance and efficiency. It may also prevent noise or distortion and unnecessary vibration of the housing and other associated parts.

Figure 3A:
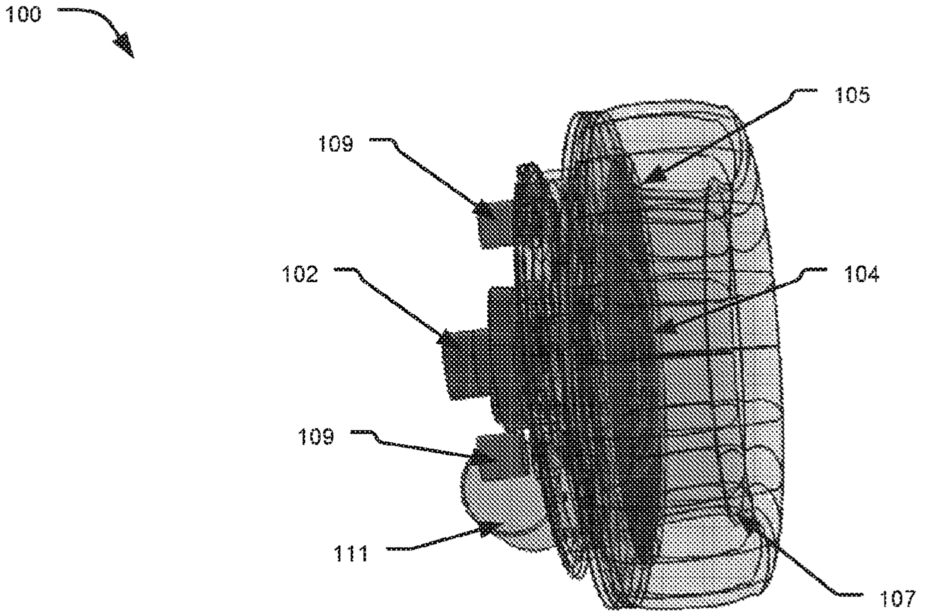
FIGS. 3A and 3B illustrate exemplary side views of a proposed headphone system 100, in accordance with an embodiment of the present disclosure.
Figure 3B:
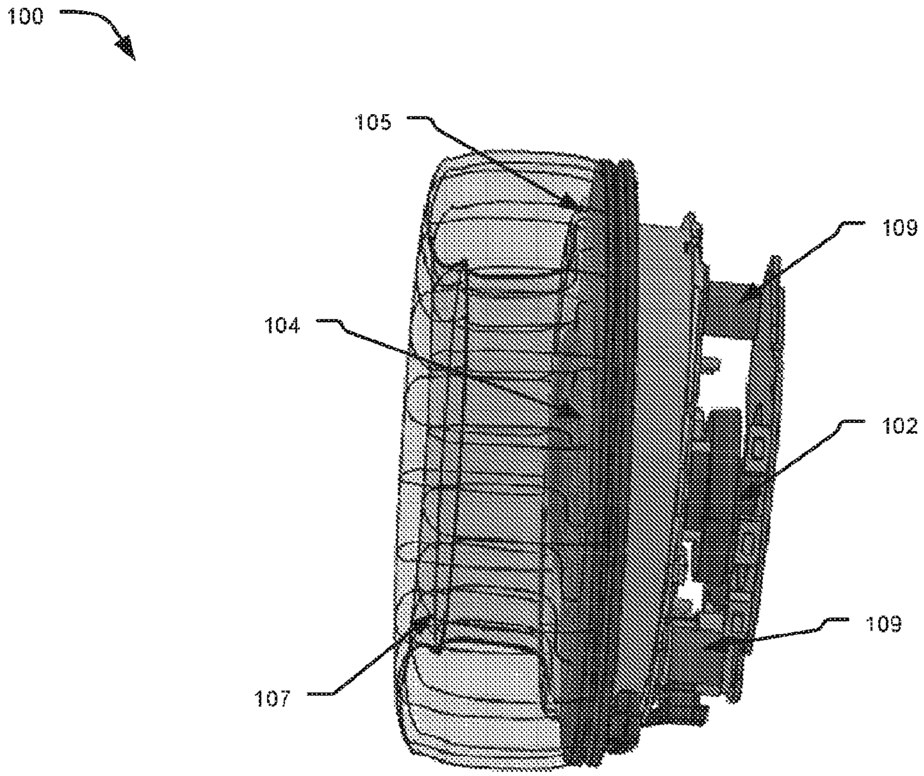

FIGS. 3A and 3B illustrate exemplary side views of a proposed headphone system 100 in accordance with an embodiment of the present disclosure. In particular, FIGS. 3A and 3B illustrate left side view and the right side of the system 100, respectively.

FIGS. 3A and 3B illustrates configuration of the one or more components such as mounting plate 106, control circuitry 108, speaker plate 105, the first audio driver 102, and the vibrational isolator 109.

In another embodiment, the system 100 may include a power assembly 111 that may be configured to supply power to at least one of the control circuitry 108, the first audio driver 102 and the second audio driver 104. The power assembly 111 may or may not be part of the control circuitry 108.

Figure 4A:
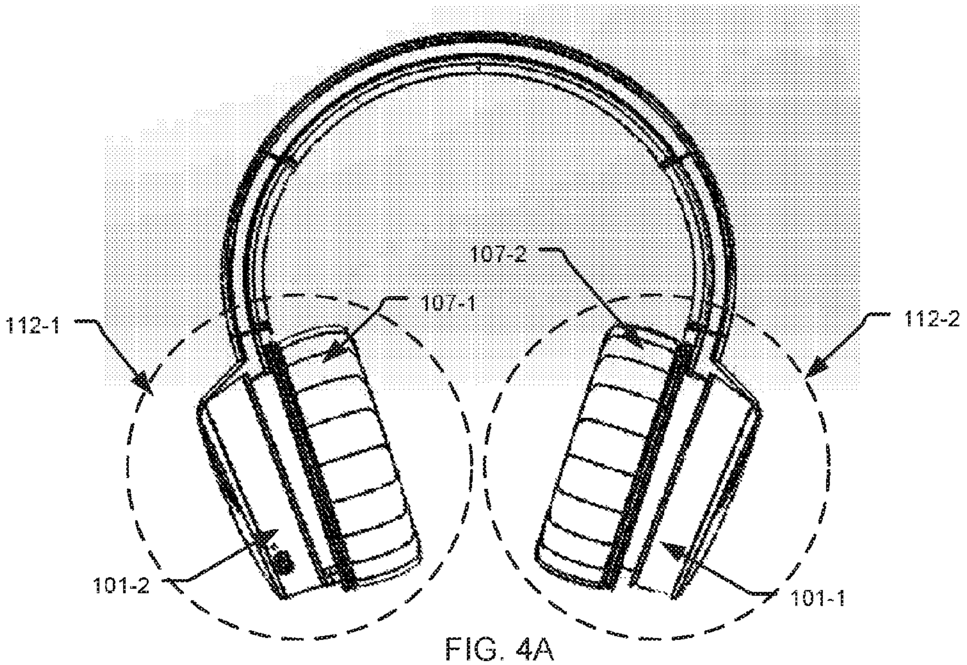
FIGS. 4A and 4B illustrate exemplary implementations of a proposed headphone system 100, in accordance with an embodiment of the present disclosure.
Figure 4B:
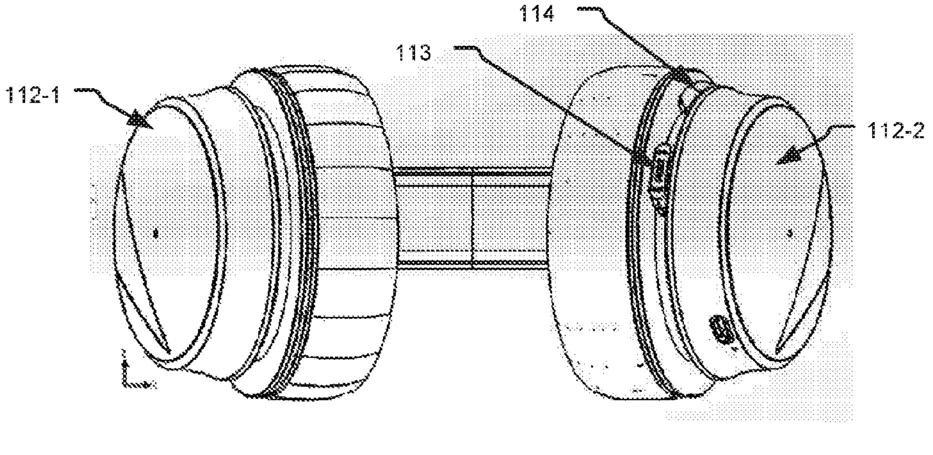

FIGS. 4A and 4B illustrate exemplary implementation of a proposed headphone system 100, in accordance with an embodiment of the present disclosure.

In an embodiment, the system 100 may be implemented as shown in FIG. 4A. FIG. 4A illustrates a headband that is connected between two ear cups 112-1 and 112-2. Each of the ear cups includes a housing 101-1/101-2 (collectively termed as 101) and an ear cushion 107-1/107-2 (collectively termed as 107).

As illustrated in FIG. 4B, system 100 may include a control interface 114 and a multimode interface 113. Specifically, multimodal interface 113 can offer a flexible, efficient and usable environment allowing users to interact through modalities, such as speech synthesis, recording, uses cases, application and so forth. In another embodiment, the control interface 114 may be configured to control one or more parameters of electrical audio signal such as first set of audio signals, second set of audio signals and/or mechanical vibration such as first set of audio vibration signals, second set of audio vibration signals. These parameters may be adjustable through the user interface which may be buttons, touch pads or via a set of instructions to be executed on the processor. The control interface 114 or multimode interface 113 may be switches, buttons, slide interface, touch, voice and the like.

Figure 5A:
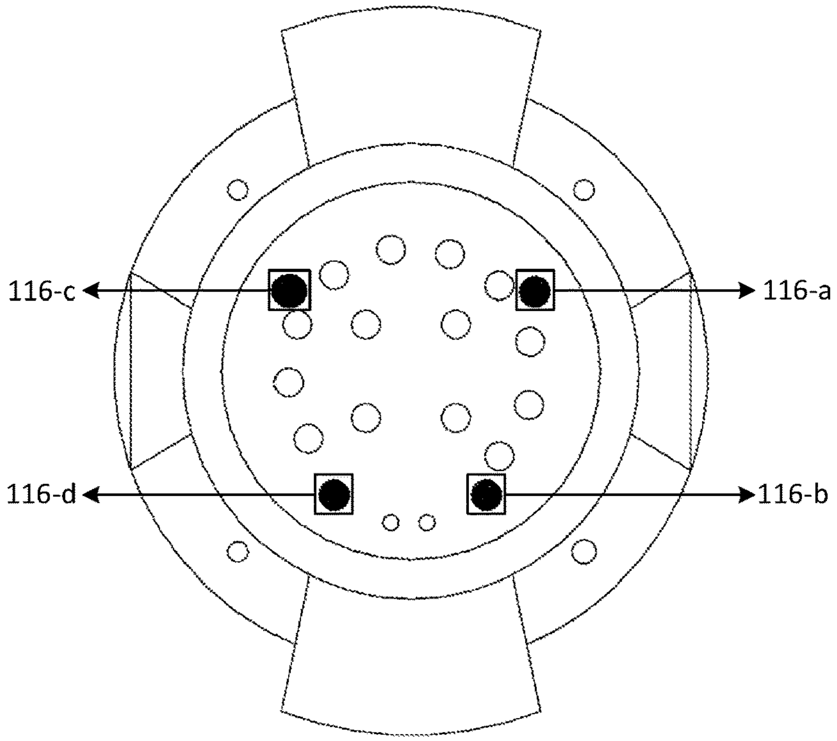
FIGS. 5A and 5B illustrate exemplary representation of an cavity of the headphone system for a fitment of a detachable audio driver and the detachable audio driver, respectively, in accordance with an embodiment of the present disclosure.
Figure 5B:
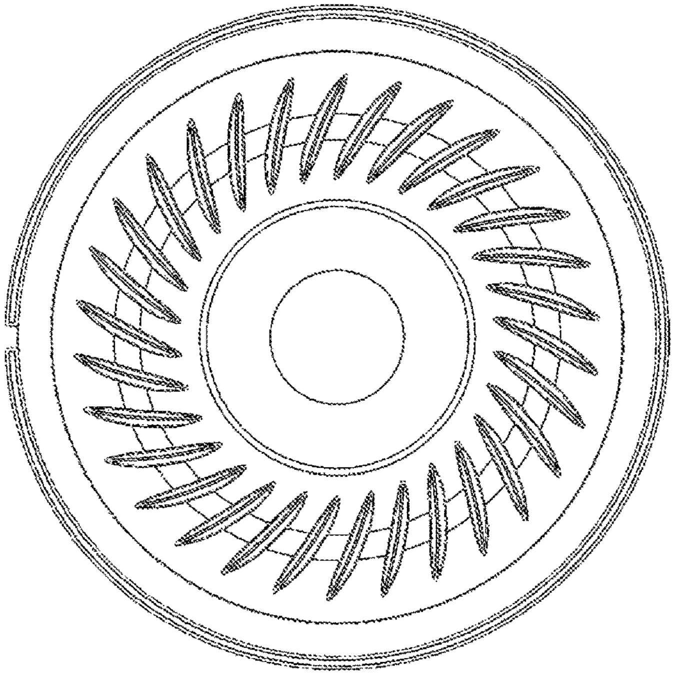

FIGS. 5A and 5B illustrate exemplary representation of an cavity of the headphone system for a fitment of a detachable audio driver and the detachable audio driver, respectively, in accordance with an embodiment of the present disclosure.

In an embodiment, at least one of the first 102 and the second 104 audio drivers detachably configured with the speaker plate 105. In an exemplary embodiment, the second 104 audio drivers may be replaced it with a different audio driver based on the song genre and the like. The system 100 may be implemented with a set of wide variety of speaker drivers which has its own unique frequency characteristics and sound signature.

In an embodiment, as illustrated in FIG. 5A, the system 100 may include a cavity for a fitment of a detachable audio driver. The cavity may be an internal configuration in the proposed headphone system for the detachable audio driver. The internal configuration may include an arrangement of magnets and connector pins/pads that may enable the audio drivers 102/104 to attach or detach to the speaker plate 105.

FIG. 5B illustrates a detachable audio driver that may also contain a similar arrangement. The first audio driver 102 and/or the second audio driver 104 may be detachable audio driver. Both cavity and the detachable audio driver are configured such that the audio driver may get attached to the cavity and gets firmly secured.

In an embodiment, the audio signal from the audio amplifiers may get transmitted to the audio driver via the connector pads 116*a*-116*d* (collectively termed as 116) and/or electric conductive magnets (Ex: Neodymium magnets). The magnets in both the internal configuration and the audio driver can be arranged in a such a manner that both get attached only when the two are properly aligned and oriented thereby ensuring preventing any short circuit, phase change or wrong connections.

Figure 6:
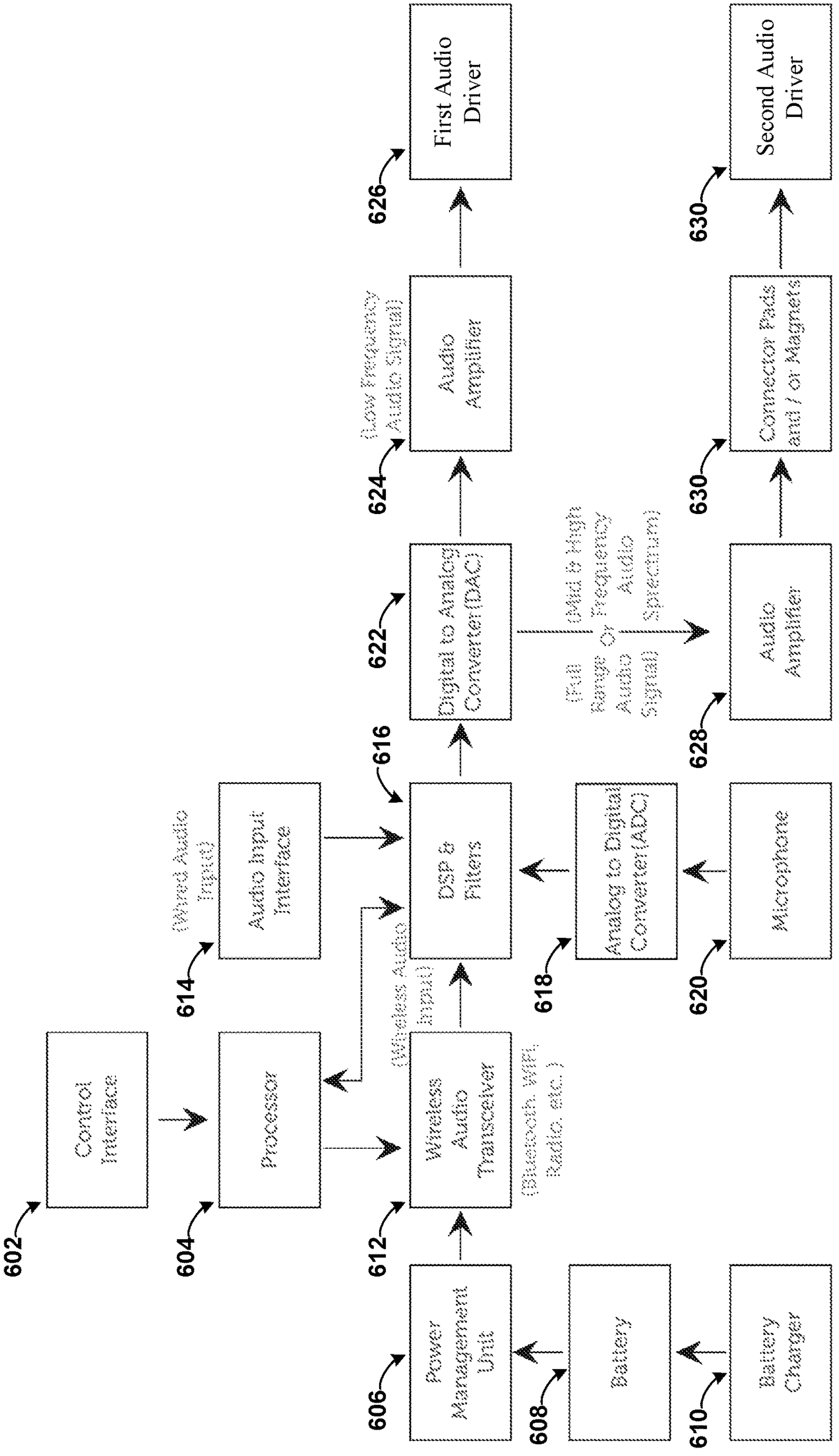
FIG. 6 illustrates a exemplary representation of block diagram of the headphone system in accordance with an exemplary embodiment of the present disclosure.

FIG. 6 illustrates a exemplary representation of block diagram of the headphone system in accordance with an exemplary embodiment of the present disclosure. One or more of the blocks of the proposed system 100 may be omitted if it possible to do, so as to minimize complexity, cost and size of the system. There may be an addition of a new block or subsystem or the arrangement/configuration of the blocks and sub system may vary in the final implementation.

In an exemplary embodiment, block 602 pertains to a control interface, the control interface may be provided to control media playback, volume turn on/off voice assistance services, to control one or more parameters, such as but not limited to, amplitude and phase difference of the electrical audio signal and mechanical vibration.

Further, block 604 pertains to a processor or a microcontroller. In an embodiment, the processor may include one or more processors or controllers. Examples of controllers include, but are not limited to PIC® 16F877A microcontroller, AVR® ATmega8 & ATmega16, Renesas® microcontroller and the like. Examples of processor can include, but are not limited to, an Intel® Itanium® or Itanium 2 processor(s), or AMD® Opteron® or Athlon MP® processor(s), Motorola® lines of processors, FortiSOC™ system on a chip processors or other future processors.

Further, block 606 pertains to power management unit, the power management unit can be used to manage power requirement of the system and may be used to optimize the power requirements. Further, block 608 pertains to a battery that may be used to provide power to the proposed headphone system. Further, block 610 pertains to a battery charger. The battery charger may be used to charge the battery of the proposed headphone system.

Further, block 612 pertains to a transceiver. The transceiver may be used for transmitting or receiving signals to and from the proposed headphone system and an exemplary audio signal generating/audio or media streaming device such as a Walkman™, an iPOD™, a mobile, laptop, computers, any audio/video playback devices and the like. Further, block 614 pertains to an audio input interface. The audio input interface may include various parameters of input for audio like RCA, Optical, 3.5 mm jack and the like in addition to wireless connectivity through on-board SoC or hardware like Bluetooth, Wi-Fi, Radio etc.

Further, block 616 pertains to (Digital Signal Processor) DSP & filters. The DSP and filters may be used for processing the received signals so as to enhance or improve audio quality, suppress noise, modify sound signature of the input audio. The proposed headphone system may include a control circuitry where the input signal is processed. In an exemplary embodiment, audio signals may be segregated into two set of audio signals—first set of audio signals and the second set of audio signals. The first set of audio signals may include, by way of example but not limited to low frequency (1 Hz-200 Hz) or entire audio spectrum (1 Hz to 22 KHz) which may be enhanced/tuned by Digital Signal Processor. In some embodiment, the configuration of the Digital signal processor (DSP) and filters may be variable and can be adjusted as per requirement through the control interface or by an automated system. The respective audio signal then gets amplified by an amplification stage. The amplification stages can consist of two independent audio amplifiers with independent gain control. The respective amplified signal is then sent to the respective audio drivers 102/104 in the system 100. The system 100 may include a stereo mode headphone that may include a pair of first 102 and the second audio drivers 104 on both sides of the proposed headphone system.

In another embodiment, block 618 pertains to analog to digital converter (ADC) that may be configured to convert the received signal to digital signal from block 460 that pertains to a microphone for receiving audio signals from a user.

In another embodiment, block 622 pertains to digital to analog converter (DAC). The DAC may be configured to convert the signals received from the DSP & filters to analog signal to segregate an audio output at low frequency, medium frequency and high frequency. Thus, the audio signals may be split in two signals.

In another embodiment, block 624 pertains to an audio amplifier may be configured to amplify low frequency part of the split signal. In another embodiment, block 626 pertains to the first audio driver 102. In another embodiment, block 628 pertains to an audio amplifier that may be used to amplify any or a combination of the low frequency signal, the medium frequency signal and the high frequency signal. further, block 630 pertains to connector pads 116 and magnets that can be used to conduct the sound based on the received signals from the audio amplifier at block 628. Further, block 632 pertains to the second audio driver 104. The first 102 and second 104 audio drivers of the proposed headphone system may be configured to convert audio signals into audio based mechanical vibration (sound signal) that can be heard and also felt/sensed by the user.

Figure 7:
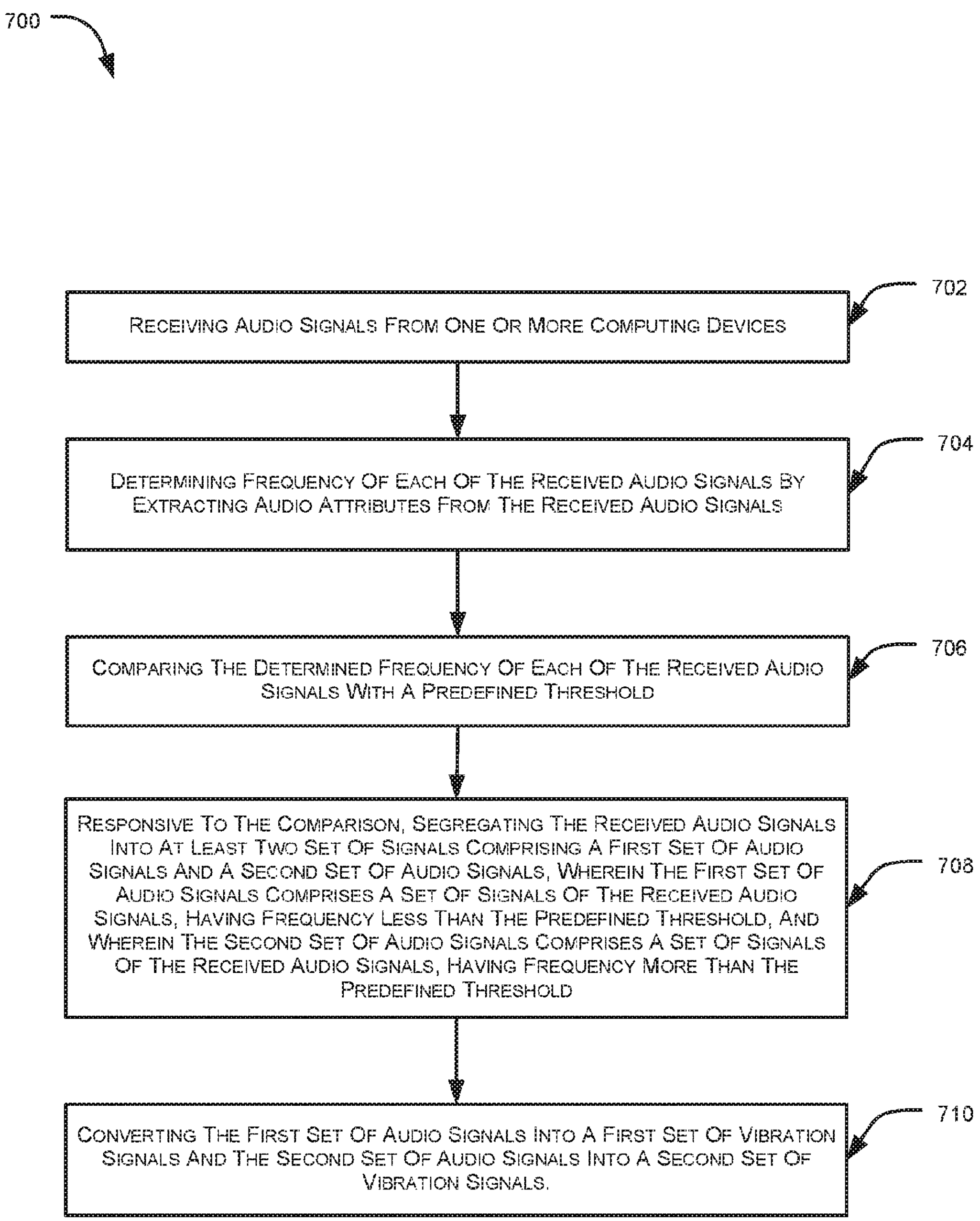
FIG. 7 illustrates a flow diagram representing a method in a headphone system, in accordance with an embodiment of the present disclosure.

FIG. 7 illustrates a flow diagram representing a method 700 in a headphone system, in accordance with an embodiment of the present disclosure.

As illustrated in FIG. 7, at step 702, audio signals from one or more computing/audio playback devices may be received. At step 704, frequency of each of the received audio signals may be determined. In an exemplary embodiment, frequency of each of the received audio signals may be determined. At step 706, the determined frequency of each of the received audio signals may be compared with a predefined threshold.

In response to the comparison, at step 708, the received audio signals may be segregated into at least two set of signals comprising a first set of audio signals and a second set of audio signals. The first set of audio signals may include a set of signals of the received audio signals, having frequency less than the predefined threshold. The second set of audio signals may include a set of signals of the received audio signals, having frequency more than the predefined threshold. At step 710, a first set of audio signals may be converted into a first set of vibration signals and a second set of audio signals may be converted into a second set of vibration signals.

The present disclosure provides a headphone system with improved sound reproduction capability especially in the low frequency range. It can also be used to enhance the low frequency audio output when compared other existing headphones. It can also be made effective to satisfy many of the audio applications and music genre. Additionally, it also allows the user to swap the speaker driver and replace it with a different driver having different acoustics and sound signatures. The headphone system may be wired or wirelessly connected with any audio, video or media sources like Music players, portable devices, Computers, Smartphones, audio recording and playback devices. The enhancement of low frequency audio and/or reproduction of low frequency audio is due to integration of audio driver without an active diaphragm dedicated to produce low frequency audio outputs. Thus, the proposed headphone system delivers clean low frequency outputs and prevents muddy sound over mid and high frequency. Particularly, the headphone system increases the low frequency output so as to provide an immersive audio experience. Further, generation of muddy sound can be prevented as the medium and high frequency sound is reproduced by another audio driver (e.g. second audio driver 104) that may be any one of dynamic driver, planar magnetic driver or electrostatic driver or any other audio reproducing component. In an embodiment, the Diaphragm-less first audio driver may also include the complete audio range (i.e. 20 Hz to 22,000 Hz) which leads to improved sound staging and sound immersion to the user.

In addition, the Diaphragm-less first audio driver along with low frequency audio may also include certain bandwidth of mid and high audio frequency to compensate for any variations or low sensitivity in certain audio frequencies that is reproduced by the dynamic driver.

In an exemplary embodiment, the proposed headphone system (wired and/or wireless) can enable improvement of sound reproduction capability particularly in the low frequency range. Further, the proposed system can also be used to enhance the low frequency audio output when compared other existing headphones. Millions of people enjoy listening to music and most are particularly interested and fascinated by the audio quality and sound reproduction especially in the low frequency range which is commonly known as bass. Many people prefer to have headphone with extra bass response or fully immersive, theatre like audio experience in headphones.

In addition, the present disclosure provides enhancement of low frequency audio and/or reproduction of low frequency audio due to the integration of Diaphragm-less first audio driver dedicated to deliver low frequency audio outputs. Further, with the Diaphragm-less first audio driver, the associated headphone system may have multi-utility and multi genre applications. There is a co-relation between genre of music and the magnitude of bass (low frequency audio component) in a music. By varying the magnitude of low frequency audio component that is produced by the Diaphragm-less first audio driver, the same associated headphone can be effective for audio reproduction of wide genre of music. Furthermore, the same headphone system can be implemented for other enhanced and effective audio playback applications like movies, videos and gaming.

In an embodiment, the system 100 may include a user control interface that changes the magnitude of the low frequency audio that is produced by the Diaphragm less first audio driver to enhance the bass response of the associated headphone or for multi-utility, multi-genre application. This control interface maybe configured in different modes and option for the user to personalize the headphones audio frequency output if they desire to do so based on user's application, requirements, preferences interests, music genre or audio/audio-video streaming application. This provides Multiutility/multi-genre use cases to the headphone.

In another embodiment, the above mentioned user control interface maybe replaced by an automated system for changing the magnitude of low frequency audio reproduction and/or modifying audio frequency response of both the driver units. In this case the headphone communicates over any associated media streaming network. During the communication and media streaming process, the data may be sent to the headphone to automatically adjust the output audio frequency profile of the diaphragm less first audio driver or combination of both and to automatically switch to the modes/options that are available without any need of any user intervention. The associated software or application that's present in audio playback devices may have many data points of the media that is streamed and also data points of the user by means of which it can recommended best possible audio configuration and audio output frequency profile of the headphone audio drivers. These data points may include type of media streamed, genre of media, different important audio frequency cues in the media etc. These data points may be collected by either the software/application, the headphone or combination of both. It may be further optimized using machine learning and the like to deliver enhanced audio experience to the user.

As described above, the low frequency audio may be delivered separately (by means of the first audio driver which doesn't have an integrated diaphragm and rather uses the ear cushion to transfer sound to the outer ear and surrounding head region. The mid and high frequency is delivered separately (by means of second audio driver through the air gap present between the diaphragm and the ear inside the Headphone cushion). This may prevent interference/mixing of audio signal as there is a separation of low frequency from mid and high frequency. It may also result in improved audio quality and listening experience and prevents any crossover or audio signal interference in the headphone. Furthermore, it may also minimize fatigue that may be caused by prolonged exposure to bass/low frequency audio in some humans.

Additionally, instead of just mid and high frequency, the second audio driver may also be configured for low frequency. Also, the Diaphragm-less first audio driver may be configured to reproduce full range audio spectrum. The range of the frequency through the first and the second audio driver may be also controlled by the user based on their preference and requirement. The proposed system may include independent and adjustable gain for Diaphragm-less first audio driver and second audio driver which can be controlled by the user with the help of onboard control interface or through one or more computing devices that may paired to the system 100. The user may also control the frequency cut-off and signal crossover and sound immersion levels through the same. Further, the user can control media playback, turn on/off voice assistance services and to control the volume of the low frequency and the mid and high frequency. The system can further include microphones that can be used for enabling to make/answer voice/video/data calls, record audio and the like.

As used herein, and unless the context dictates otherwise, the term "coupled to" is intended to include both direct coupling (in which two elements that are coupled to each other or in contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

It should be apparent to those skilled in the art that many more modifications besides those already described are possible without departing from the inventive concepts herein. The inventive subject matter, therefore, is not to be restricted except in the spirit of the appended claims. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

In the description of the present specification, reference to the term "one embodiment," "an embodiments", "an example", "an instance", or "some examples" and the description is meant in connection with the embodiment or example described The particular feature, structure, material, or characteristic included in the present invention, at least one embodiment or example. In the present specification, the term of the above schematic representation is not necessarily for the same embodiment or example. Furthermore, the particular features structures, materials, or characteristics described in any one or more embodiments or examples in proper manner. Moreover, those skilled in the art can be described in the specification of different embodiments or examples are joined and combinations thereof.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Advantages of the Invention

The present disclosure provides an improved headphone system that facilitates enhanced and more powerful low frequency response in the headphone.

The present disclosure provides an headphone system that has improved listening experience compared to conventional headphones.

The present disclosure provides a headphone system that provides removable and replaceable speaker driver with different tuning sound signatures.

The present disclosure provides a headphone system that minimizes fatigue compared to conventional headphones.

The present disclosure provides a headphone system that has compact size, cost-effective, and easy to implement.

We claim:

1. A headphone system, the system comprising:
- a housing;
- a receiver configured with the housing and to receive audio signals from one or more computing devices;
- a control circuitry configured with the housing, the control circuitry comprising one or more processors communicatively coupled to a memory storing a set of instructions executable by the one or more processors, the one or more processors upon execution of the set of instructions causes the control circuitry to:
  - determine frequency of each of the received audio signals;
  - compare the determined frequency of each of the received audio signals with a predefined threshold, wherein the predefined threshold is in a range of 1 Hz to 1000 Hz; and
  - responsive to the comparison, segregate the received audio signals into at least two sets of signals comprising a first set of audio signals and a second set of audio signals, wherein the first set of audio signals comprises a set of signals of the received audio signals, having frequencies less than the predefined threshold, and wherein the second set of audio signals comprises a set of signals of the received audio signals, having frequencies more than the predefined threshold;
- a first audio driver operatively coupled to the control circuitry, the first audio driver being configured to convert the first set of audio signals into a first set of vibration signals; and
- a second audio driver operatively coupled to the control circuitry, the second audio driver being configured to convert the second set of audio signals into a second set of vibration signals.

2. The system as claimed in claim 1, wherein the system comprises an ear cushion coupled to the first audio driver, wherein the coupling of the first audio driver with the ear cushion allows the first set of vibration signals to pass from the first audio driver to the ear cushion.

3. The system as claimed in claim 2, wherein the system comprises a mounting plate coupled with a speaker plate of the housing, wherein the first audio driver is coupled to the mounting plate such that the first set of vibration signals is transferred from the first audio driver to the ear cushion through the mounting plate, and wherein the second audio driver is attached to the speaker plate such that the second set of vibration signals is transferred from the second audio driver to an outer air medium.

4. The system as claimed in claim 1, wherein the system comprises a vibrational isolator configured to reduce vibration at one or more components of the housing, which does not contribute in audio production.

5. The system as claimed in claim 1, wherein at least one of the first audio driver or the second audio driver is detachably coupled to a speaker plate of the housing.

6. The system as claimed in claim 1, wherein the control circuitry is configured to control one or more parameters of the first set of vibration signals and the second set of vibration signals for audio production of wide genre of music.

7. The system as claimed in claim 1, wherein the control circuitry comprises one or more audio amplifiers configured to control amplitude of at least one of the first set of audio signals or the second set of audio signals.

8. The system as claimed in claim 1, wherein the first set of vibration signals is transmitted through fluid or solid medium, and wherein the second set of vibration signals is transmitted through air medium.

9. The system as claimed in claim 1, wherein the control circuitry is operated automatically.

10. A method in a headphone system, the method comprising:
- receiving, at a receiver of the headphone system, audio signals from one or more computing devices;
- determining, by one or more processors of a control circuitry of the headphone system, frequency of each of the received audio signals by extracting audio attributes from the received audio signals;
- comparing, by the one or more processors, the determined frequency of each of the received audio signals with a predefined threshold, wherein the predefined threshold is in a range of 1 Hz to 1000 Hz;
- responsive to the comparison, segregating, by the one or more processors, the received audio signals into at least two sets of signals comprising a first set of audio signals and a second set of audio signals, wherein the first set of audio signals comprises a set of signals of the received audio signals, having frequencies less than the predefined threshold, and wherein the second set of audio signals comprises a set of signals of the received audio signals, having frequencies more than the predefined threshold; and
- converting, by a first audio driver, the first set of audio signals into a first set of vibration signals and converting, by a second audio driver, the second set of audio signals into a second set of vibration signals.

* * * * *